US011726357B2

United States Patent
Teragawa

(10) Patent No.: US 11,726,357 B2
(45) Date of Patent: Aug. 15, 2023

(54) LIQUID CRYSTAL DISPLAY APPARATUS

(71) Applicant: SHARP KABUSHIKI KAISHA, Sakai (JP)

(72) Inventor: Daisuke Teragawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/840,190

(22) Filed: Jun. 14, 2022

(65) Prior Publication Data
US 2022/0404658 A1 Dec. 22, 2022

Related U.S. Application Data

(60) Provisional application No. 63/212,312, filed on Jun. 18, 2021.

(51) Int. Cl.
*G02F 1/1333* (2006.01)

(52) U.S. Cl.
CPC .... *G02F 1/13332* (2021.01); *G02F 1/133314* (2021.01); *G02F 1/133317* (2021.01); *G02F 2202/28* (2013.01)

(58) Field of Classification Search
CPC ........... G02F 1/13332; G02F 1/133317; G02F 2202/28; G02F 2201/54
See application file for complete search history.

(56) References Cited

U.S. PATENT DOCUMENTS

| 9,329,419 B2 * | 5/2016 | Ohtomo | G02F 1/133308 |
| 2005/0057703 A1 * | 3/2005 | Tsubokura | G02F 1/13394 |
| | | | 349/58 |
| 2020/0292869 A1 * | 9/2020 | Yonemura | G02F 1/133308 |

FOREIGN PATENT DOCUMENTS

| JP | 2013-210509 A | 10/2013 |
| JP | 2013210509 A | * 10/2013 |

* cited by examiner

*Primary Examiner* — Jia X Pan

(74) *Attorney, Agent, or Firm* — ScienBiziP, P.C.

(57) ABSTRACT

A liquid crystal display apparatus includes: a display panel having a display region and a peripheral region; a front cover; a first buffer member; a panel holder; and a second buffer member. The peripheral region includes four corner portions and four central portions. At least one buffer member of the first buffer member and the second buffer member includes a plurality of cushion members and at least one resin sheet. The at least one buffer member does not include a cushion member formed of a resin between the four corner portions and the front cover or between the four corner portions and the panel holder.

19 Claims, 11 Drawing Sheets

LIQUID CRYSTAL DISPLAY APPARATUS

CROSS-REFERENCE TO RELATED APPLICATION

The present application claims priority from Provisional Application 63/212,312, the content to which is hereby incorporated by reference into this application.

BACKGROUND OF THE INVENTION

1. Field of the Invention

The disclosure relates to a liquid crystal display apparatus.

2. Description of the Related Art

Liquid crystal display apparatuses are being used in various applications such as televisions and mobile terminals. A liquid crystal display apparatus generally includes a display panel, a frame (or a bezel) provided on an observer side of the display panel, and a chassis (or a panel holder) that holds the display panel from the rear surface side, the display panel having two opposing substrates (for example, glass substrates) and a liquid crystal layer between these substrates.

Liquid crystal display apparatuses are required to be thinner, and glass substrates used in the display panels are also thin. When glass substrates are thin, the glass substrates may be easily deformed (warped), and in large glass substrates used in a large liquid crystal display apparatus for a television application and the like, deformation (warpage) easily occurs due to the weight of the large glass substrates.

A panel holder included in a liquid crystal display apparatus of Japanese Patent Application Laid-Open No. 2013-210509 (a panel holder that holds a display panel from the rear surface side) includes a ridge that protrudes toward a display panel side so that the deformed display panel can be held without applying an excessive force. The height and arrangement (position) of the ridge are determined according to the degree of deformation of the display panel which is assumed in advance. In the liquid crystal display apparatus of Japanese Patent Application Laid-Open No. 2013-210509, an excessive force being applied to the deformed display panel from the panel holder is suppressed, and thus deterioration of display quality due to disorder of the orientation of liquid crystal molecules due to the excessive force applied thereto is suppressed.

SUMMARY

Technical Problem

According to the study of the present inventor, the liquid crystal display apparatus of Japanese Patent Application Laid-Open No. 2013-210509 is not always able to sufficiently suppress deterioration of display quality. Depending on a usage environment and usage conditions, the degree of deformation of a display panel may vary. When the degree of deformation is different from that assumed in advance, deterioration of display quality may not be sufficiently suppressed.

The disclosure has been made to solve the above-described problems, and an object of the disclosure is to provide a liquid crystal display apparatus in which deterioration of display quality is effectively suppressed even in a state where a display panel is deformed.

According to embodiments of the disclosure, solutions according to the following items are provided.

Item 1

A liquid crystal display apparatus includes a display panel having a display surface having a shape of a rectangle and a back surface on a side opposite to the display surface, and has a display region including a central portion of the rectangle and a peripheral region surrounding the display region; a front cover provided on the display surface side of the display panel and covering the peripheral region of the display panel; a first buffer member provided between the display panel and the front cover; a panel holder provided on the back surface side of the peripheral region of the display panel; and a second buffer member which is provided between the display panel and the panel holder, in which the peripheral region includes four corner portions each including a corresponding one of four corners of the rectangle, and four central portions which are each disposed between corresponding ones of the four corner portions and extend along four sides of the rectangle, at least one buffer member of the first buffer member and the second buffer member includes a plurality of cushion members which are formed of a resin and each of which is provided between one of the four central portions and the front cover or between one of the four central portions and the panel holder, and at least one resin sheet which has a one principal surface and an other principal surface on a side opposite to the one principal surface, is bent such that the one principal surface is on an inner side of the other principal surface, and is provided at least between the four corner portions and the front cover or at least between the four corner portions and the panel holder, and the at least one buffer member does not include a cushion member formed of a resin between the four corner portions and the front cover or between the four corner portions and the panel holder.

Item 2

In the liquid crystal display apparatus according to item 1, the first buffer member includes a plurality of first cushion members which are formed of a resin and each of which is provided between any one of the four central portions and the front cover, and at least one first resin sheet which has a first principal surface and a second principal surface on a side opposite to the first principal surface, is bent such that the first principal surface is on an inner side of the second principal surface, and is provided at least between the four corner portions and the front cover, the first buffer member does not include a cushion member formed of a resin between the four corner portions and the front cover.

Item 3

In the liquid crystal display apparatus according to item 2, the at least one first resin sheet is also provided between each of the four central portions and the front cover, and the at least one first resin sheet is bent to accommodate the plurality of first cushion members therein.

Item 4

In the liquid crystal display apparatus according to item 3, each of the plurality of first cushion members includes an upper surface on the front cover side and a lower surface on the display panel side, and the upper surface of each of the plurality of first cushion members is adhered to the first principal surface of the at least one first resin sheet.

Item 5

In the liquid crystal display apparatus according to item 2, the four central portions include regions where the at least one first resin sheet is not provided between the four central portions and the front cover.

Item 6

In the liquid crystal display apparatus according to item 5, each of the plurality of first cushion members includes an upper surface on the front cover side and a lower surface on the display panel side, and the upper surface of each of the plurality of first cushion members is adhered to the front cover.

Item 7

In the liquid crystal display apparatus according to any one of items 2 to 6, the second principal surface of the at least one first resin sheet and the front cover are adhered to each other through an adhesive layer.

Item 8

In the liquid crystal display apparatus according to item 7, the second principal surface of the at least one first resin sheet and the display panel are adhered to each other through an adhesive layer.

Item 9

In the liquid crystal display apparatus according to item 7, the second principal surface of the at least one first resin sheet and the display panel are in direct contact.

Item 10

In the liquid crystal display apparatus according to any one of items 2 to 9, the at least one first resin sheet and the plurality of first cushion members are black.

Item 11

In the liquid crystal display apparatus according to item 1, the second buffer member includes a plurality of second cushion members which are formed of a resin and each of which is provided between any one of the four central portions and the panel holder, and at least one second resin sheet which has a third principal surface and a fourth principal surface on a side opposite to the third principal surface, is bent such that the third principal surface is on an inner side of the fourth principal surface, and is provided at least between the four corner portions and the panel holder, and the second buffer member does not include a cushion member formed of a resin between the four corner portions and the panel holder.

Item 12

In the liquid crystal display apparatus according to item 11, the at least one second resin sheet is also provided between each of the four central portions and the panel holder, and the at least one second resin sheet is bent to accommodate the plurality of second cushion members therein.

Item 13

In the liquid crystal display apparatus according to item 12, each of the plurality of second cushion members has an upper surface on the display panel side and a lower surface on the panel holder side, and the upper surface of each of the plurality of second cushion members is adhered to the third principal surface of the at least one second resin sheet.

Item 14

In the liquid crystal display apparatus according to item 11, the four central portions include a region in which the at least one second resin sheet is not provided between the four central portions and the panel holder.

Item 15

In the liquid crystal display apparatus according to item 14, each of the plurality of second cushion members has an upper surface on the display panel side and a lower surface on the panel holder side, and the upper surface of each of the plurality of second cushion members is adhered to the display panel.

Item 16

In the liquid crystal display apparatus according to any one of items 11 to 15, the fourth principal surface of the at least one second resin sheet and the panel holder are adhered to each other through an adhesive layer.

Item 17

In the liquid crystal display apparatus according to item 16, the fourth principal surface of the at least one second resin sheet and the display panel are adhered to each other through an adhesive layer.

Item 18

In the liquid crystal display apparatus according to item 16, the fourth principal surface of the at least one second resin sheet and the display panel are in direct contact with each other.

Item 19

In the liquid crystal display apparatus according to item 1, the first buffer member includes a plurality of first cushion members which are formed of a resin and each of which is provided between any one of the four central portions and the front cover, and at least one first resin sheet which has a first principal surface and a second principal surface on a side opposite to the first principal surface, is bent such that the first principal surface is on an inner side of the second principal surface, and is provided at least between the four corner portions and the front cover, the first buffer member does not include a cushion member formed of a resin between the four corner portions and the front cover, the second buffer member includes a plurality of second cushion members which are formed of a resin and each of which is provided between any one of the four central portions and the panel holder, and at least one second resin sheet which has a third principal surface and a fourth principal surface on a side opposite to the third principal surface, is bent such that the third principal surface is on an inner side of the fourth principal surface, and is provided at least between the four corner portions and the panel holder, and the second buffer member does not include a cushion member formed of a resin between the four corner portions and the panel holder.

According to embodiments of the disclosure, a liquid crystal display apparatus in which deterioration of display quality is effectively suppressed even in a state where a display panel is deformed is provided.

DETAILED DESCRIPTION

Hereinafter, embodiments of the disclosure will be described with reference to the accompanying drawings. Note that the present invention is not limited to the embodiments to be described below. In the following drawings, constituent elements having substantially the same functions may be denoted by common reference signs, and description thereof may be omitted.

First Embodiment

Figure 1:
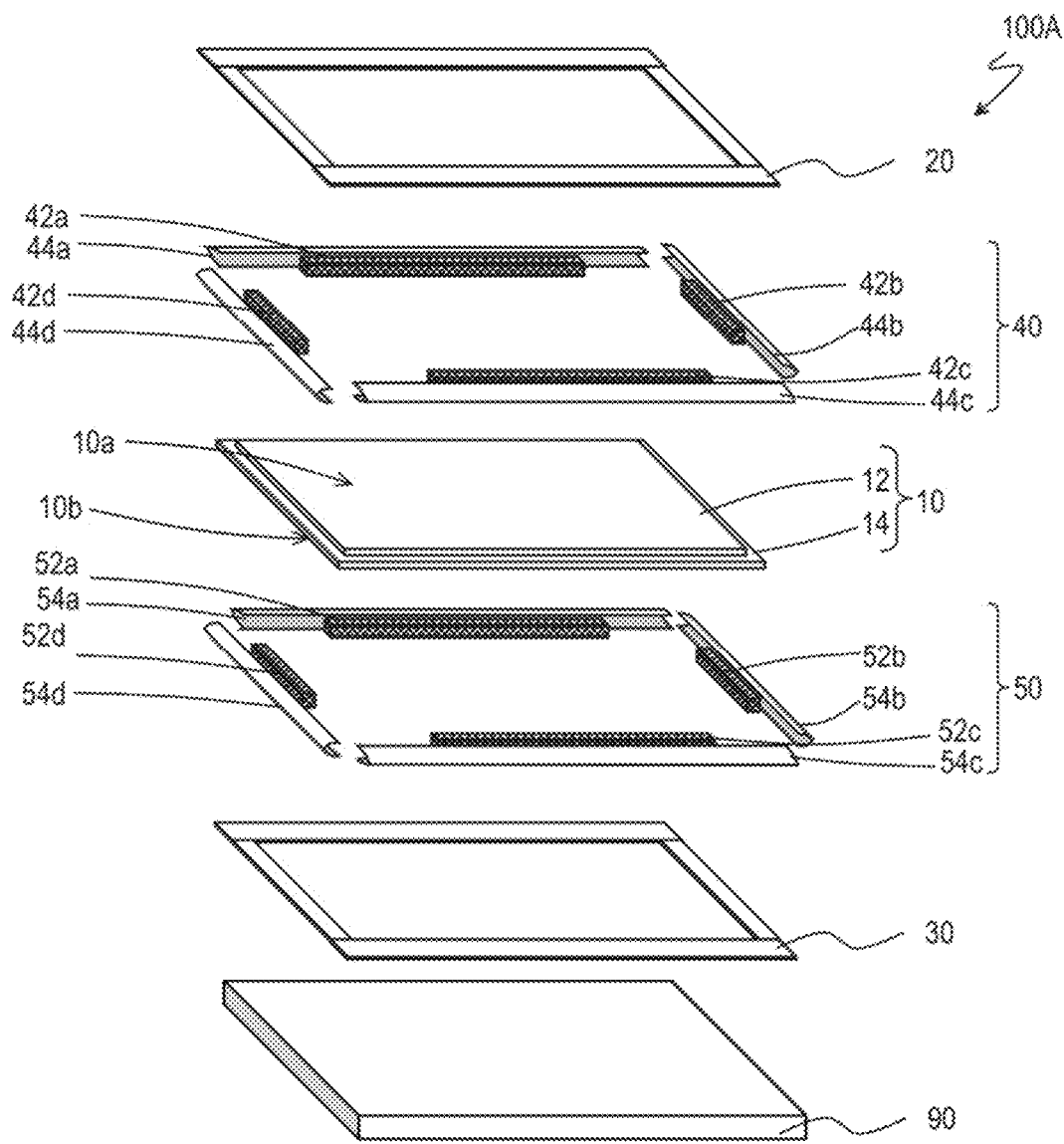
FIG. 1 is a schematic exploded perspective view of a liquid crystal display apparatus 100A according to an embodiment of the disclosure.
Figure 2:
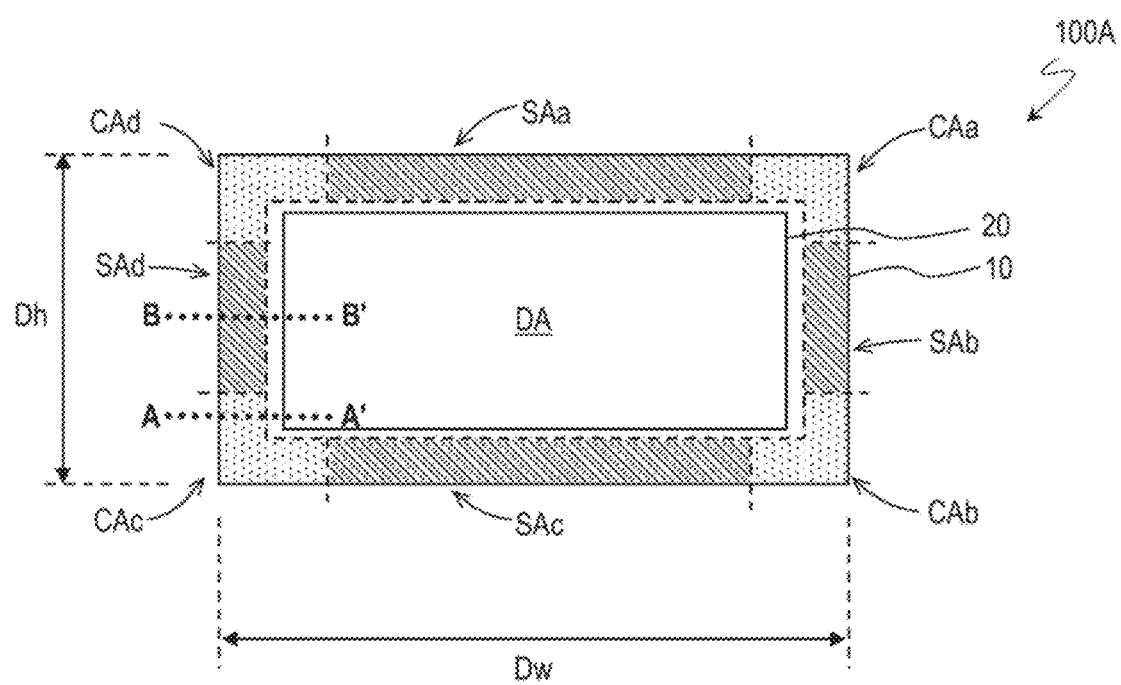
FIG. 2 is a schematic plan view of the liquid crystal display apparatus 100A from a display surface side.
Figure 3:
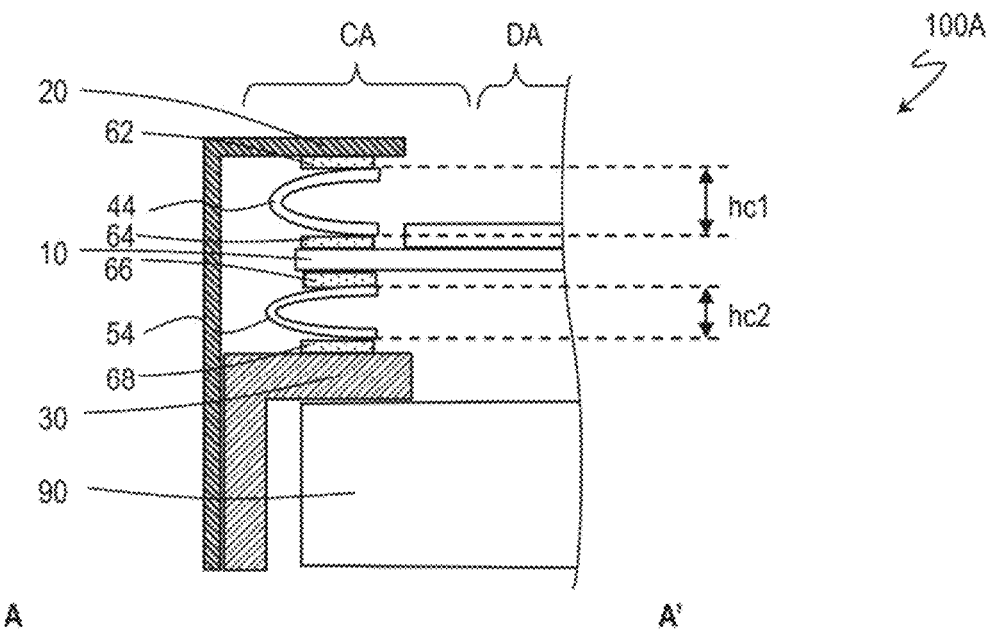
FIG. 3 is a schematic cross-sectional view of the liquid crystal display apparatus 100A along a line A-A' in FIG. 2.
Figure 4:
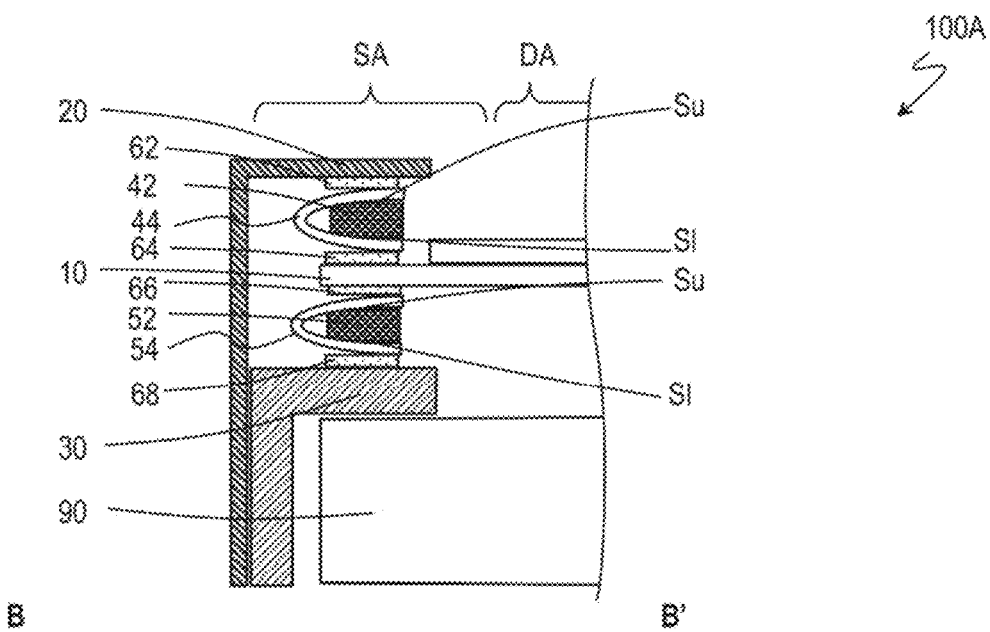
FIG. 4 is a schematic cross-sectional view of the liquid crystal display apparatus 100A along a line B-B' in FIG. 2.

FIG. 1 is a schematic exploded perspective view of a liquid crystal display apparatus 100A according to an embodiment of the disclosure. FIG. 2 is a schematic plan view of the liquid crystal display apparatus 100A from a display surface side (observer side). FIG. 3 is a cross-sectional view of the liquid crystal display apparatus 100A along a line A-A' in FIG. 2, and FIG. 4 is a cross-sectional view of the liquid crystal display apparatus 100A along a line B-B' in FIG. 2.

As illustrated in FIG. 1, the liquid crystal display apparatus 100A includes a display panel 10, a front cover 20 provided on an observer side of the display panel 10, a panel holder 30 provided on a side opposite to the observer side of the display panel 10, a first buffer member 40 provided between the display panel 10 and the front cover 20, and a second buffer member 50 provided between the display panel 10 and the panel holder 30. FIG. 1 also illustrates a backlight device 90 that emits light toward a rear surface of the liquid crystal display apparatus 100A.

The display panel 10 includes a rectangular display surface (a principal surface on the observer side) 10a and a back surface 10b on a side opposite to the display surface 10a. The display panel 10 is a liquid crystal display panel including two opposing substrates 12 and 14 and a liquid crystal layer provided between the two substrates 12 and 14. The display panel 10 includes a display region DA including a rectangular central portion (a region surrounded by a dashed line in FIG. 2) and a peripheral region RA surrounding the display region DA. The peripheral region RA includes four corner portions CAa, CAb, CAc, and CAd (regions hatched by dots in FIG. 2) each including four corners of a rectangle and four central portions SAa, SAb, SAc, and SAd (regions hatched by right-downward inclined lines in FIG. 2) that are disposed between the four corner portions CAa to CAd and extend along four sides of the rectangle. Note that FIG. 2 schematically illustrates an example of a positional relationship between the display region DA and the peripheral region RA and positional relationships between the four corner portions CAa to CAd included in the peripheral region RA and the four central portions SAa to SAd; however, embodiments of the present invention are not limited thereto. The four corner portions CAa, CAb, CAc, and CAd may be collectively referred to as corner portions CA, and the four central portions SAa, SAb, SAc, and SAd may be collectively referred to as central portions SA.

The front cover 20 is provided on the display surface 10a side (observer side) of the display panel 10, and covers the peripheral region RA of the display panel 10. The panel holder 30 is provided on the back surface 10b side of the peripheral region RA of the display panel 10.

The first buffer member 40 includes first cushion members 42a, 42b, 42c, and 42d formed of a resin and first resin sheets 44a, 44b, 44c, and 44d each of which has a first principal surface and a second principal surface on a side opposite to the first principal surface and is bent so that the first principal surface is on the inner side of the second principal surface. The first cushion members 42a, 42b, 42c, and 42d may be collectively referred to as first cushion members 42, and the first resin sheets 44a, 44b, 44c, and 44d may be collectively referred to as first resin sheets 44. The first cushion members 42 are respectively provided between the four central portions SAa, SAb, SAc, and SAd and the front cover 20. In this example, the first cushion members 42a, 42b, 42c, and 42d are respectively provided between the central portions SAa, SAb, SAc, and SAd and the front cover 20. The first resin sheets 44 are respectively provided between the four central portions SAa to SAd, the four corner portions CAa to CAd and the front cover 20. The first buffer member 40 does not include a cushion member formed of a resin, as illustrated in FIG. 3, between the four corner portions CAa to CAd and the front cover 20. In this example, the first buffer member 40 includes the first cushion member 42 and the bent first resin sheet 44, as illustrated in FIG. 4, between the four central portions SAa to SAd and the front cover 20.

The second buffer member 50 includes second cushion members 52a, 52b, 52c, and 52d formed of a resin and second resin sheets 54a, 54b, 54c, and 54d each of which has a first principal surface and a second principal surface on a side opposite to the first principal surface and is bent so that the first principal surface is on the inner side of the second principal surface. The second cushion members 52a, 52b, 52c, and 52d may be collectively referred to as second cushion members 52, and the second resin sheets 54a, 54b, 54c, and 54d may be collectively referred to as second resin sheets 54. The second cushion members 52 are respectively provided between the four central portions SAa, SAb, SAc, and SAd and the panel holder 30. In this example, each of the second cushion members 52a, 52b, 52c, and 52d are provided between corresponding ones of the central portions SAa, SAb, SAc, and SAd and the panel holder 30. The second resin sheets 54 are respectively provided between the four central portions SAa to SAd, and the four corner portions CAa to CAd, and the panel holder 30. The second buffer member 50 does not include a cushion member formed of a resin, as illustrated in FIG. 3, between the four corner portions CAa to CAd and the panel holder 30. In this example, the second buffer member 50 includes the second cushion member 52 and the second resin sheet 54 that is bent, as illustrated in FIG. 4, between the four central portions SAa to SAd and the panel holder 30.

As described below, in comparison with a liquid crystal display apparatus according to a Comparative Example, the liquid crystal display apparatus 100A can effectively suppress deterioration of display quality even in a state where the display panel 10 is deformed.

Figure 15:
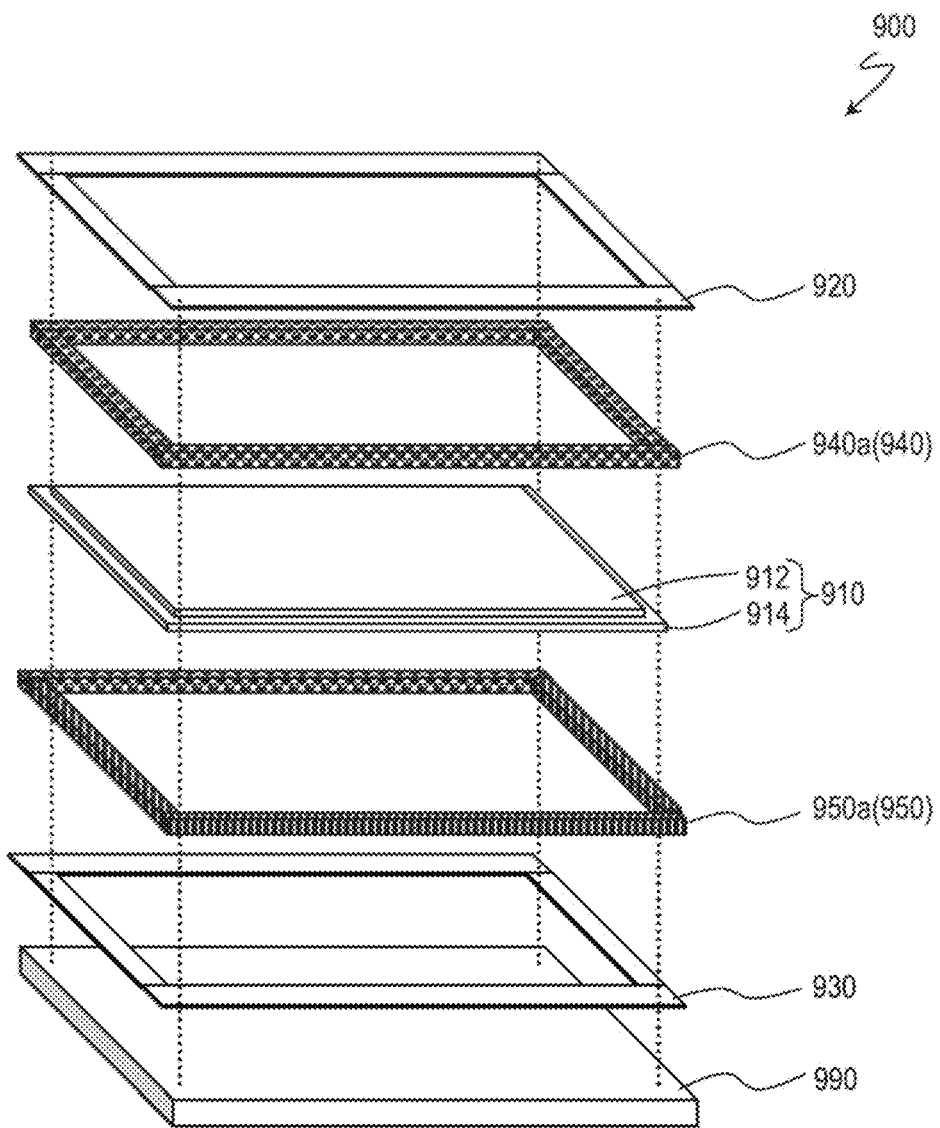
FIG. 15 is a schematic exploded perspective view of a liquid crystal display apparatus 900 according to a Comparative Example.

First, the liquid crystal display apparatus according to the Comparative Example and deterioration of display quality occurring in the liquid crystal display apparatus according to the Comparative Example will be described. FIG. 15 illustrates a schematic exploded perspective view of a liquid crystal display apparatus 900 according to a Comparative Example.

The liquid crystal display apparatus 900 according to the Comparative Example includes a display panel (liquid crystal display panel) 910, a front cover 920 provided on a display surface side of the display panel 910, a panel holder 930 provided on a side opposite to a display surface of the display panel 910, a first buffer member 940 provided between the display panel 910 and the front cover 920, and a second buffer member 950 provided between the display panel 910 and the panel holder 930. The display panel 910 includes two opposing substrates 912 and 914 and a liquid crystal layer provided between the two substrates 912 and 914. The liquid crystal display apparatus 900 according to the Comparative Example differs from the liquid crystal display apparatus 100A in terms of the first buffer member 940 and the second buffer member 950. The first buffer member 940 includes a cushion member 940a formed of a resin, the cushion member 940a being provided to surround a display region DA of the display panel 910. The second buffer member 950 includes a cushion member 950a formed of a resin, the cushion member 950a being provided to surround the display region of the display panel 910. FIG. 15 also illustrates a backlight device 990 that emits light toward a rear surface of the liquid crystal display apparatus 900.

Figure 16:
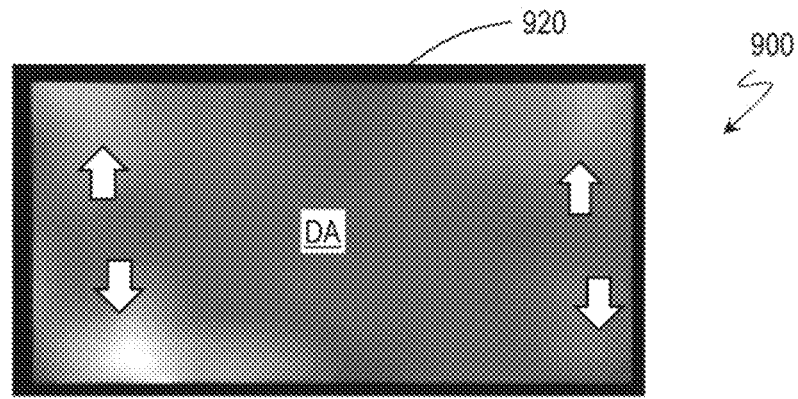
FIG. 16 is a schematic plan view of the liquid crystal display apparatus 900 according to the Comparative Example from the display surface side, and schematically illustrates a display screen when the liquid crystal display apparatus 900 according to the Comparative Example performs a full screen black display.
Figure 17:
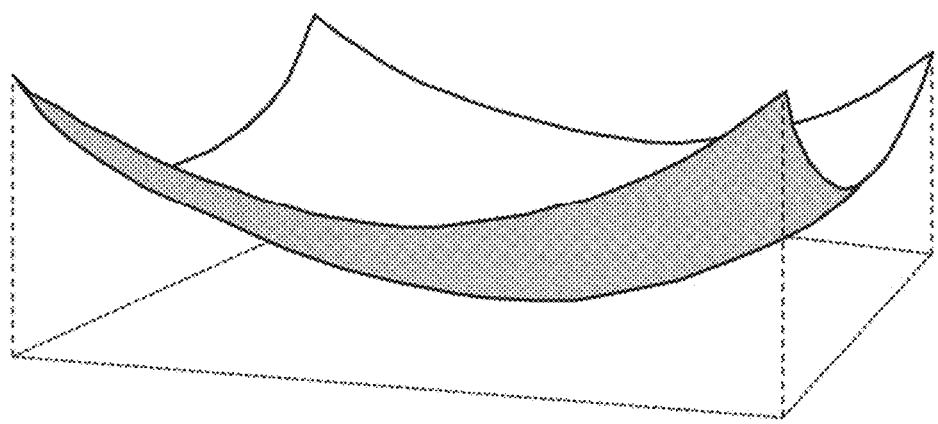
FIG. 17 is a schematic diagram illustrating an in-plane distribution of a warpage amount of a substrate included in a liquid crystal display panel.

FIG. 16 is a schematic plan view when the liquid crystal display apparatus 900 according to the Comparative Example is seen from a display surface side and schematically illustrates a display screen when the liquid crystal display apparatus 900 according to the Comparative Example performs full screen black display. As indicated by a white arrow in FIG. 16, when the liquid crystal display apparatus 900 according to the Comparative Example performs a full screen black display, four corners of the display region DA may be displayed white (which may be a void) as compared with other locations. When the display panel 910 is deformed, that is, the substrates (glass substrates) 912 and 914 are deformed, the warpage amount increases from the center of the substrates 912 and 914 toward four corners, for example, as indicated as an in-plane distribution of the warpage amount in FIG. 17. The warpage amount at the center of each of the four sides is smaller than that in each of the four corners. In a peripheral region RA of the display panel 910, an excessive force is applied from the cushion members 940a and 950a to the vicinity of the four corners having a large warpage amount of the substrate, and thus disorder occurs in the orientation of liquid crystal molecules. Due to the disorder occurring in the orientation of liquid crystal molecules around the four corners, the above-described display unevenness (brightness unevenness) occurs, which results in deterioration of display quality.

On the other hand, in the liquid crystal display apparatus 100A of the present embodiment, a cushion member formed of a resin is not provided in regions corresponding to the four corner portions CAa to CAd having a large deformation amount (warpage amount) in the peripheral region RA of the display panel 10, for example, as illustrated in FIG. 3. An excessive force being applied to the four corner portions CAa to CAd of the display panel 10 from the cushion member is suppressed, and disorder of the orientation of liquid crystal molecules due to the excessive force applied thereto is suppressed. Resin sheets (first resin sheets 44 and second resin sheets 54) which are bent as buffer members are provided in the regions corresponding to the four corner portions CAa to CAd. Since the bent resin sheets (the first resin sheets 44 and the second resin sheets 54) are more easily deformed in the thickness direction of the display panel 10 than the cushion member formed of a resin, the bent resin sheets can be deformed in accordance with the degree of the deformation (warpage) of the display panel 10. Since the bent resin sheets (the first resin sheets 44 and the second resin sheets 54) easily follow the deformation (warpage) of the display panel 10, an excessive force being applied to the display panel 10 is suppressed. Accordingly, even in a state where the display panel 10 is deformed, display unevenness occurring due to disorder of the orientation of liquid crystal molecules around four corners as in the liquid crystal display apparatus 900 according to the Comparative Example is suppressed, and deterioration of display quality is suppressed. Although the display panel 10 is illustrated in a flat plate shape for the sake of simplicity in the drawings, for example, in a case where the four corners of the display panel 10 are deformed to the front cover 20 side with respect to the center of the display panel 10 due to the warpage of the display panel 10, a length hc1 (see FIG. 3) of the display panel 10 of the first resin sheet 44 in the thickness direction is reduced, and a length hc2 of the display panel 10 of the second resin sheet 54 in the thickness direction is increased. In a case where the display panel 10 is warped in the opposite direction, that is, in a case where four corners of the display panel 10 are deformed toward the panel holder 30 side with respect to the center of the display panel 10, a length hc1 of the display panel 10 of the first resin sheet 44 in the thickness direction increases, and a length hc2 of the display panel 10 of the second resin sheet 54 in the thickness direction decreases. In this manner, in the liquid crystal display apparatus 100A, deterioration of display quality is effectively suppressed even in a state where the display panel 10 is deformed. The deterioration of display quality can be suppressed regardless of the degree of deformation of the display panel 10 and the direction of deformation.

Although the liquid crystal display apparatus 100A according to the present embodiment does not include a cushion member formed of a resin in regions corresponding to the four corner portions CAa to CAd, resin sheets (the first resin sheets 44 and the second resin sheets 54) which are bent as buffer members are provided in the regions corresponding to the four corner portions CAa to CAd, and cushion members formed of a resin (the first cushion members 42 and the second cushion members 52) are provided in regions (that is, the four central portions SAa to SAd) other than the four corner portions CAa to CAd in the peripheral region RA. The bent resin sheets and the cushion members are provided between the front cover 20 and the display panel 10 so as to surround the display region DA, and thus it is possible to prevent light emitted from a backlight from leaking and prevent foreign substances (dust, dirt, or the like) from entering the liquid crystal display apparatus 100A from between the front cover 20 and the display panel 10. Similarly, the bent resin sheets and the cushion members are provided between the display panel 10 and the panel holder 30 so as to surround the display region DA, and thus it is possible to prevent light emitted from a backlight from leaking and prevent foreign substances from entering the liquid crystal display apparatus 100A from between the display panel 10 and the panel holder 30. The liquid crystal display apparatus 100A can also suppress deterioration of display quality due to light leakage and infiltration of foreign substances.

Although the liquid crystal display apparatus 100A according to the present embodiment does not include cushion members formed of a resin in regions corresponding to the four corner portions CAa to CAd, cushion members (the first cushion members 42 and the second cushion members 52) formed of a resin are provided in regions corresponding to the regions (that is, the four central portions SAa to SAd) other than the four corner portions CAa to CAd in the peripheral region RA, and thus influence on load bearing characteristics, influence from the viewpoint of protecting the display panel 10 from an impact, and influence from the viewpoint of suppressing the rattling of the display panel 10 are small. From the viewpoint of load bearing characteristics, the viewpoint of protecting the display panel 10 from an impact, and the viewpoint of suppressing the rattling of the display panel 10, it is preferable that the lengths of the first cushion member 42 and the second cushion member 52 (the lengths along four sides of the display panel 10) be as long as possible in a range in which the deterioration of display quality can be suppressed. The lengths of the first cushion member 42 and the second cushion member 52 (that is, the areas of the four central portions SAa to SAd in the area of the peripheral region RA) may be appropriately adjusted in accordance with the size, application, usage environment, and the like of the liquid crystal display apparatus 100A.

As a resin for forming the cushion members, for example, rubber (vulcanized rubber), foamed rubber, silicone rubber, or the like may be suitably used. Here, the resin is used in a broad sense including elastomer, rubber, thermosetting resin, thermoplastic resin (plastic), and the like. Various known plastics (thermoplastic resins) can be suitably used as plastics, and for example, polyolefin such as polyethylene and polypropylene, polystyrene, mixtures (blends) thereof, or foams of these plastics (foamed resins) can be used.

As the first resin sheets 44 and the second resin sheets 54, sheets that have a certain degree of stiffness and bend are preferable, and in consideration of cost, for example, a polyethylene terephthalate (PET) sheet, a polycarbonate (PC) sheet, and the like can be suitably used. It is preferable that the first resin sheets 44 and the second resin sheets 54 be disposed in the liquid crystal display apparatus 100A in a state where the resin sheets include a portion having a U-shaped or V-shaped cross section without being divided by a fold when bent as illustrated in the cross-sectional views of FIGS. 3 and 4. The thicknesses of the first resin sheets 44 and the second resin sheets 54 are not limited, but each of the thicknesses is independently, for example, equal to or greater than 0.2 mm and equal to or less than 1 mm.

Figure 5:
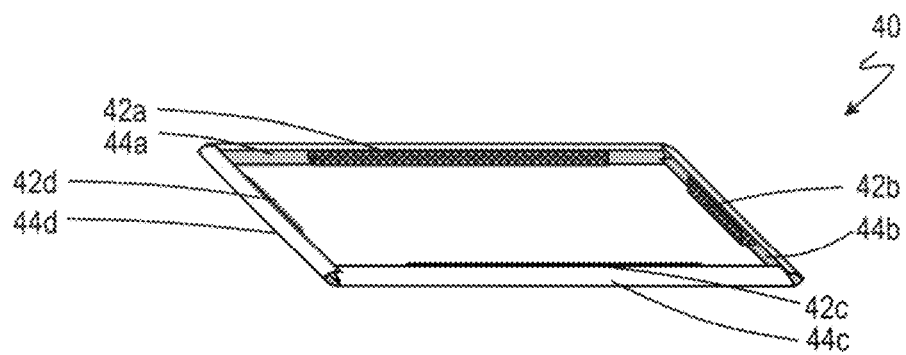
FIG. 5 is a schematic perspective view of a first buffer member 40 included in the liquid crystal display apparatus 100A.

FIG. 5 is a schematic perspective view of the first buffer member 40. In this example, the first resin sheets 44 are provided to surround the display region DA, and thus it is possible to prevent foreign substances (dust, dirt, or the like) from entering the liquid crystal display apparatus 100A from between the front cover 20 and the display panel 10. In addition, it is possible to prevent light from leaking from between the display panel 10 and the front cover 20. From the viewpoint of suppressing infiltration of foreign substances and light leakage from between the front cover 20 and the display panel 10, it is preferable that the first resin sheets 44 not have a hole (through hole). For example, it is preferable that a hole such as a perforation be not formed in a fold of the first resin sheets 44.

From the viewpoint of effectively suppressing infiltration of foreign substances and light leakage from between the front cover 20 and the display panel 10, it is preferable that the first buffer member 40 be adhered to each of the front cover 20 and the display panel 10 via an adhesive layer. In this example, as illustrated in FIGS. 3 and 4, a second principal surface S2 (a principal surface on the outer side) of the bent first resin sheets 44 is adhered to the front cover 20 through an adhesive layer 62 and is adhered to the display panel 10 through an adhesive layer 64. The adhesive layers 62 and 64 are, for example, double-sided tape.

From the viewpoint of suppressing light leakage, it is preferable that the first resin sheets 44 and the first cushion members 42 have a black color or an achromatic dark color.

A detailed structure of the first buffer member 40 is described. In this example, the first resin sheets 44 are respectively provided between the four central portions SAa to SAd, the four corner portions CAa to CAd, and the front cover 20. Specifically, each of the first resin sheets 44a to 44d is provided between any one of the central portion SAa to SAd, a corner portion adjacent to the central portion thereof, and the front cover 20. For example, the first resin sheet 44a is provided between the central portion SAa, the corner portions CAa and CAd adjacent to the central portion SAa, and the front cover 20. The first resin sheets 44 are bent such that the first cushion members 42 are accommodated inside of the first resin sheets 44 at the central portions SAa to SAd. As illustrated in the cross-sectional views of FIGS. 3 and 4, the first resin sheet 44 is bent such that the cross-section thereof includes a V-shaped or U-shaped portion. For example, the first resin sheet 44a is bent such that the first cushion member 42a is accommodated inside of the first resin sheet 44a at the central portion SAa. Each of the first cushion members 42a to 42d has an upper surface Su on the front cover 20 side and a lower surface S1 on the display panel 10 side, and the upper surface Su of the first cushion member 42 is adhered to the first principal surface S1 of the first resin sheet 44. The upper surface Su of the first cushion member 42 may have adhesiveness, and the upper surface Su of the first cushion member 42 may be adhered to the first principal surface S1 of the first resin sheet 44 through an adhesive layer.

Figure 6:
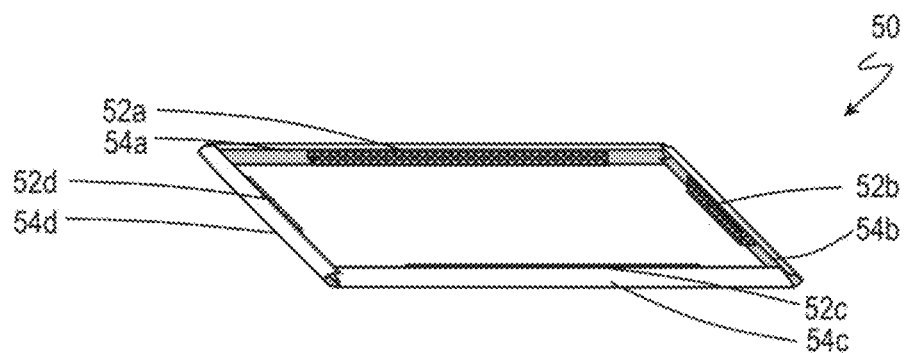
FIG. 6 is a schematic perspective view illustrating a second buffer member 50 included in the liquid crystal display apparatus 100A.

FIG. 6 is a schematic perspective view of the second buffer member 50.

The second buffer member 50 has a structure similar to that of the first buffer member 40. The second resin sheets 54 are provided to surround the display region DA, and thus it is possible to prevent foreign substances (dust, dirt, or the like) from entering the liquid crystal display apparatus 100A and prevent light from leaking from between the display panel 10 and the panel holder 30. From the viewpoint of suppressing infiltration of foreign substances and light leakage from between the display panel 10 and the panel holder 30, it is preferable that the second resin sheets 54 not have a hole (through hole).

From the viewpoint of effectively suppressing infiltration of foreign substances and light leakage from between the display panel 10 and the panel holder 30, it is preferable that the second buffer member 50 be adhered to each of the display panel 10 and the panel holder 30 through an adhesive layer. In this example, as illustrated in FIGS. 3 and 4, the second principal surface S2 of the bent second resin sheet 54 is adhered to the display panel 10 through an adhesive layer 66 and is adhered to the panel holder 30 through an adhesive layer 68. The adhesive layers 66 and 68 are, for example, double-sided tape.

From the viewpoint of suppressing brightness unevenness of the liquid crystal display apparatus 100A, it is preferable that the second resin sheets 54 and the second cushion members 52 have a small difference in reflectivity. However, it is sufficient if the evaluation of brightness unevenness in a front view of the display panel is within an allowable range, and the materials of the second resin sheets 54 and the second cushion members 52 can be determined in consideration of the cost and procurement of the materials. The colors of the second resin sheets 54 and the second cushion members 52 are independently, for example, black, gray, white, and the like.

The detailed structure of the second buffer member 50 is described. In this example, the second buffer member 50 has a structure similar to that of the first buffer member 40. In this example, the second resin sheets 54 are respectively provided between the four central portions SAa to SAd, the four corner portions CAa to Cad, and the panel holder 30. Specifically, each of the second resin sheets 54a to 54d is provided between any one of the central portion SAa to SAd, a corner portion adjacent to the central portion thereof, and the panel holder 30. For example, the second resin sheet 54a is provided between the central portion SAa, the corner portions CAa and CAd adjacent to the central portion SAa, and the panel holder 30. The second resin sheets 54 are bent such that the second cushion members 52 are accommodated inside of the second resin sheets 54 at the central portions SAa to SAd. As illustrated in the cross-sectional views of FIGS. 3 and 4, the second resin sheet 54 is bent such that the cross section thereof includes a V-shaped or U-shaped portion. For example, the second resin sheet 54a is bent such that the second cushion member 52a is accommodated inside of the second resin sheet 54a at the central portion SAa. Each of the second cushion members 52a to 52d has an upper surface Su on the display panel 10 side and a lower surface Sl on the panel holder 30 side, and the lower surface Sl of the second cushion member 52 is adhered to the first principal surface S1 of the second resin sheet 54. The lower surface Sl of the second cushion member 52 may have adhesiveness, and the lower surface Sl of the second cushion member 52 may be adhered to the first principal surface S1 of the second resin sheet 54 through an adhesive layer.

An example of a method of manufacturing the first buffer member 40 is described with reference to FIGS. 7A, 7B, and 7C.

Figure 7A:
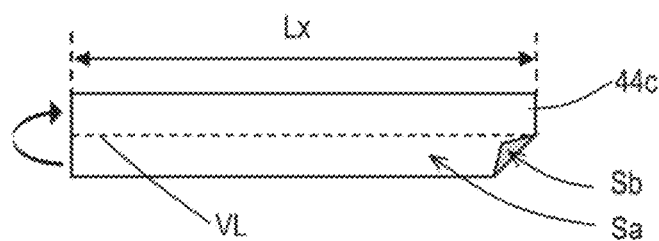
FIG. 7A is a schematic view illustrating a method of manufacturing the first buffer member 40.

As illustrated in FIG. 7A, the first resin sheets 44a to 44d having the first principal surface S1 and the second principal surface S2 on a side opposite to the first principal surface S1 are prepared. Here, the first resin sheets 44a and 44c are disposed along the long side (length Dw) of the display panel 10 that is rectangular, and the first resin sheets 44b and 44d are disposed along the short side (length Dh) of the rectangular display panel 10, and thus the first resin sheets 44a to 44d having an appropriate size are prepared. For example, a length Lx of one side of the first resin sheet 44c is substantially equal to, for example, the length Dw of the side of the display panel 10 that is rectangular.

Figure 7B:
FIG. 7B is a schematic view illustrating a method of manufacturing the first buffer member 40.
Figure 7C:
FIG. 7C is a schematic view illustrating a method of manufacturing the first buffer member 40.

As illustrated in FIG. 7B, the first resin sheet 44c is bent on a dashed line VL so that the first principal surface S1 is on the inner side of the second principal surface S2, and the first cushion member 42c is accommodated therein (FIG. 7C). In the drawing, a fold is indicated by the dashed line VL for ease of understanding, but it is preferable that perforations or the like be not formed on the dashed line VL. This is similarly performed for the first resin sheets 44a, 44b, and 44d to assemble the first resin sheets 44a to 44d, and thus the first buffer member 40 as illustrated in FIG. 5 is obtained.

The second buffer member 50 can be manufactured in the same manner as the first buffer member 40.

Note that in the embodiment, both the buffer members, namely, the first buffer member 40 and the second buffer member 50 each include a plurality of cushion members (first cushion member 42, second cushion member 52) and at least one resin sheet (first resin sheet 44, second resin sheet 54); however, the first buffer member 40 or the second buffer member 50 may include a plurality of cushion members and at least one resin sheet. For example, in a case where it is known in advance that the display panel is warped toward the front cover, the first buffer member 40 on the front cover side may include the plurality of first cushion members 42 and at least one first resin sheet 44. In this case, the second buffer member 50 on the panel holder side may include a cushion member formed of a resin and provided surrounding the display region DA of the display panel as in the Comparative Example.

Second Embodiment

Figure 8:
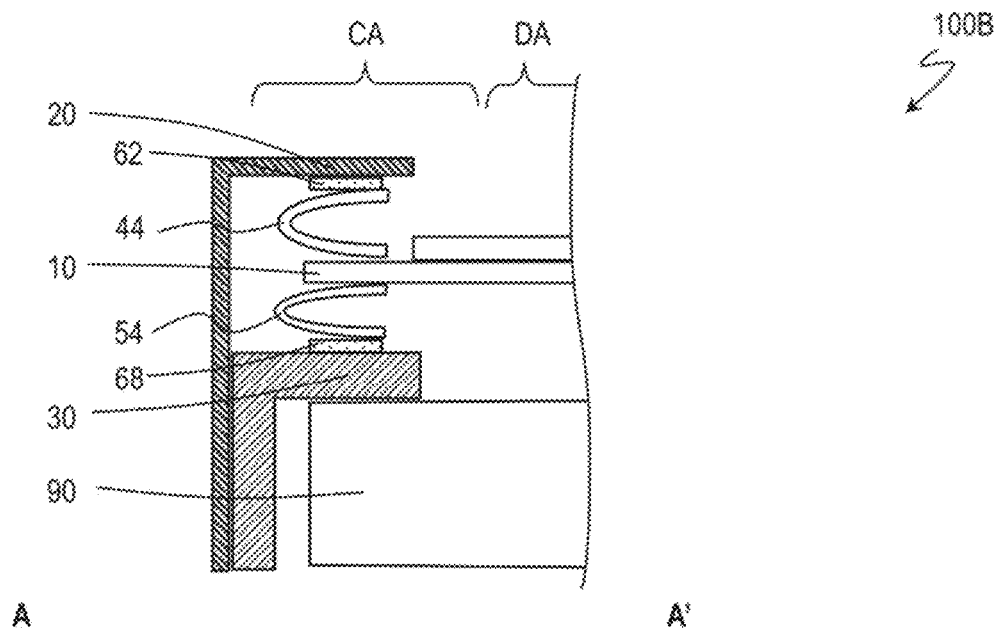
FIG. 8 is a schematic cross-sectional view of a liquid crystal display apparatus 100B according to another embodiment of the disclosure, and is a cross-sectional view of a corner portion CA of a peripheral region RA of a display panel 10.
Figure 9:
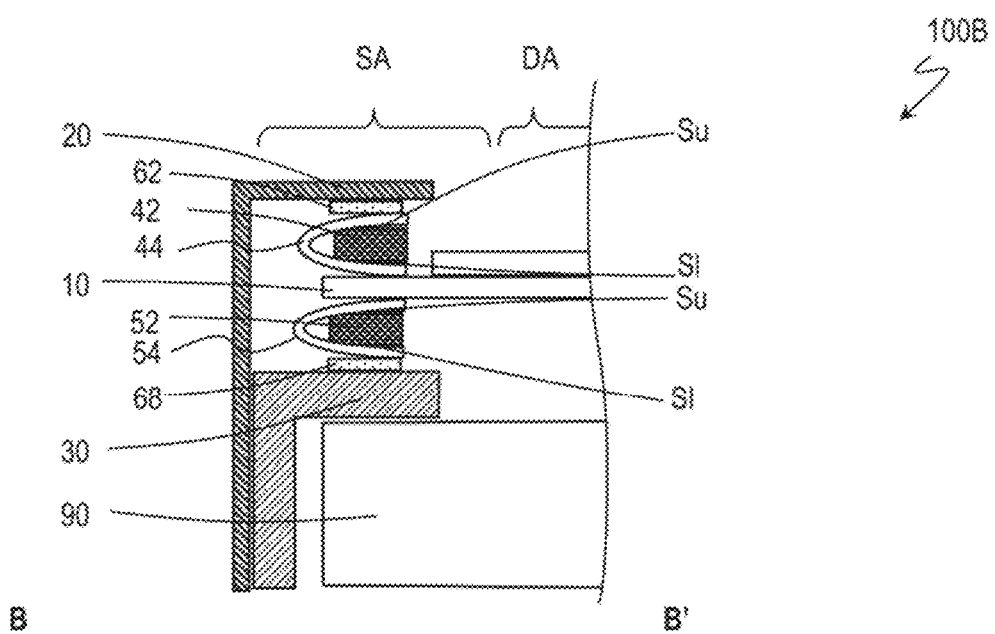
FIG. 9 is a schematic cross-sectional view of the liquid crystal display apparatus 100B, and is a cross-sectional view of a central portion SA of the peripheral region RA of the display panel 10.

A liquid crystal display apparatus 100B according to the present embodiment will be described with reference to FIGS. 8 and 9. FIG. 8 is a cross-sectional view of a corner portion CA of the liquid crystal display apparatus 100B and corresponds to the cross-sectional view taken along the line A-A' in FIG. 2. FIG. 9 is a cross-sectional view of a central portion SA of the liquid crystal display apparatus 100B and corresponds to the cross-sectional view taken along the line B-B' in FIG. 2.

As illustrated in FIGS. 8 and 9, the liquid crystal display apparatus 100B differs from the liquid crystal display apparatus 100A in that the liquid crystal display apparatus 100B does not include an adhesive layer 64 between a first resin sheet 44 and a display panel 10 and an adhesive layer 66 between a second resin sheet 54 and the display panel 10. That is, a second principal surface of the first resin sheet 44 and the display panel 10 are in direct contact with each other, and the second resin sheet 54 and the display panel 10 are in direct contact with each other.

Similarly to the liquid crystal display apparatus 100A, the liquid crystal display apparatus 100B can effectively suppress deterioration of display quality in a state where the display panel 10 is deformed. The liquid crystal display apparatus 100B can further reduce manufacturing costs (including the number of manufacturing steps) as compared with the liquid crystal display apparatus 100A.

The liquid crystal display apparatus 100B has an inferior effect on suppressing the infiltration of foreign substances as compared with the liquid crystal display apparatus 100A. However, the degree of infiltration of foreign substances may vary depending on the size, application, usage environment, and the like of the liquid crystal display apparatus, and thus it is sufficient to select whether to prioritize an effect of suppressing the infiltration of foreign substances or prioritize a reduction in manufacturing costs in accordance with the size, application, usage environment, and the like of the liquid crystal display apparatus. For example, in a liquid crystal display apparatus installed outdoors (for example, a display apparatus for signage), foreign substances are more likely to infiltrate than a liquid crystal display apparatus used indoors (for example, a television and a monitor), and thus the infiltration of foreign substances can be effectively suppressed. Alternatively, as compared with a large liquid crystal display apparatus for television applications or the like, in small and medium-sized liquid crystal display apparatuses for mobile applications or the like, the deformation amount (warpage amount) of a substrate of the display panel is small, and thus a region in which a cushion member is not provided (regions corresponding to four corner portions CAa to CAd) can be made narrow. In such a case, even when the adhesive layers 64 and 66 are omitted, the influence on the effect of suppressing the infiltration of foreign substances may be small.

Third Embodiment

In the previous embodiment, the bent resin sheet is provided to surround the display region DA of the display panel 10. In the present embodiment, a bent resin sheet is provided in a region corresponding to a corner portion CA of a peripheral region RA, but a region corresponding to a central portion SA includes a region where a bent resin sheet is not provided.

Figure 10:
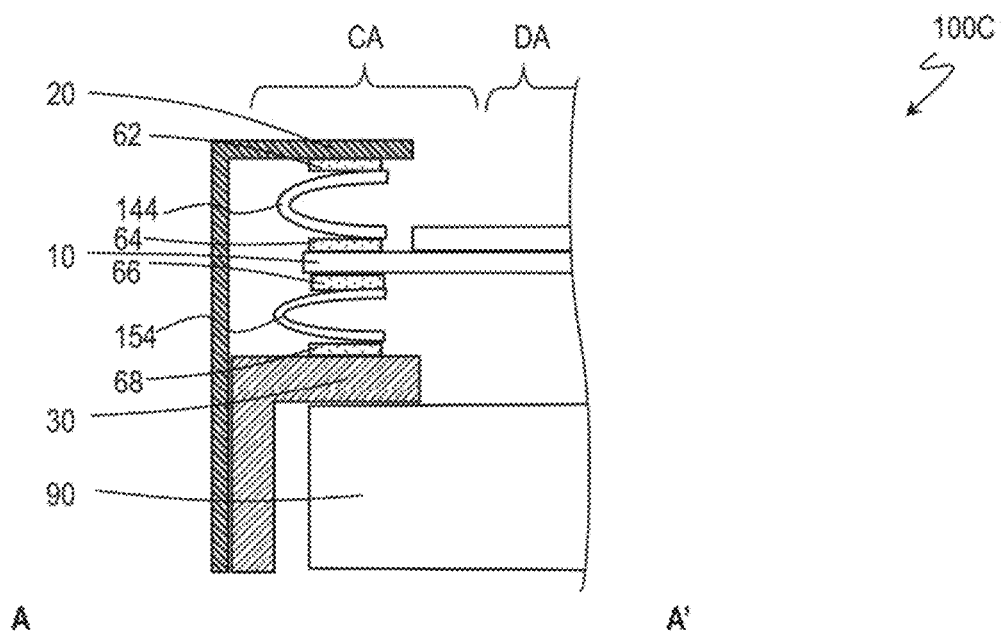
FIG. 10 is a schematic cross-sectional view of a liquid crystal display apparatus 100C according to still another embodiment of the disclosure, and is a cross-sectional view of a corner portion CA of a peripheral region RA of a display panel 10.
Figure 11:
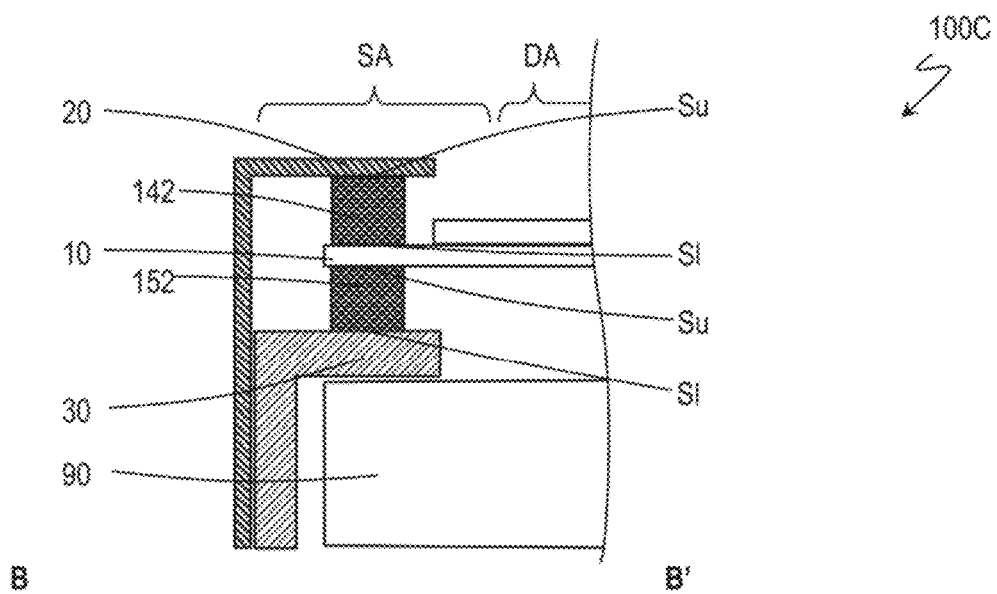
FIG. 11 is a schematic cross-sectional view of the liquid crystal display apparatus 100C, and is a cross-sectional view of a central portion SA of the peripheral region RA of the display panel 10.
Figure 12:
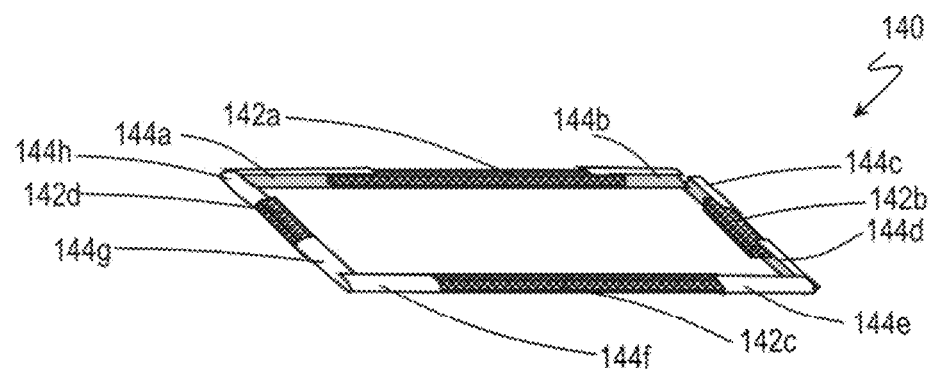
FIG. 12 is a schematic perspective view illustrating a first buffer member 140 included in the liquid crystal display apparatus 100C.
Figure 13:
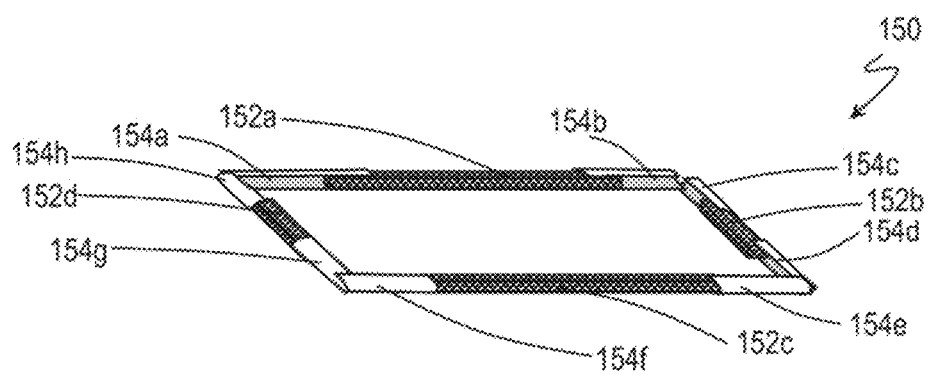
FIG. 13 is a schematic perspective view illustrating a second buffer member 150 included in the liquid crystal display apparatus 100C.

A liquid crystal display apparatus 100C according to the present embodiment will be described with reference to FIGS. 10, 11, 12, and 13. FIG. 10 is a cross-sectional view of a corner portion CA of the liquid crystal display apparatus 100C and corresponds to the cross-sectional view taken along the line A-A' in FIG. 2. FIG. 11 is a cross-sectional view of a central portion SA of the liquid crystal display apparatus 100C and corresponds to the cross-sectional view taken along the line B-B' in FIG. 2. FIG. 12 is a schematic perspective view of a first buffer member 140 included in the liquid crystal display apparatus 100C. FIG. 13 is a schematic perspective view of a second buffer member 150 included in the liquid crystal display apparatus 100C.

The structures of the first buffer member 140 and the second buffer member 150 in the liquid crystal display apparatus 100C differ from those of the first buffer member 40 and the second buffer member 50 included in the liquid crystal display apparatus 100A. The first buffer member 140 differs from the first resin sheet 44 of the first buffer member 40 in terms of the shape of a first resin sheet 144. The other structures of the first buffer member 140 are the same as those of the first buffer member 40, and the constituent elements of the first buffer member 140 are denoted by reference signs obtained by adding 100 to the reference signs of the corresponding constituent elements of the first buffer member 40.

The first buffer member 140 includes first resin sheets 144a, 144b, 144c, 144d, 144e, 144f, 144g, and 144h each of which has a first principal surface and a second principal surface on a side opposite to the first principal surface and is bent such that the first principal surface is on the inner side of the second principal surface. The first resin sheets 144a to 144h are collectively referred to as first resin sheets 144. The first resin sheets 144 are provided between at least four corner portions CAa to CAd and a front cover 20. The first resin sheets 144 and the first cushion members 142 are provided to surround the display region DA, and regions corresponding to four central portions SAa to SAd include a region where the first resin sheets 144 are not provided. In a region where the first resin sheets 144 are not provided, an upper surface Su of the first cushion members 142 is adhered to the front cover 20. The upper surface Su of the first cushion members 142 may have adhesiveness.

The second buffer member 150 includes second resin sheets 154a, 154b, 154c, 154d, 154e, 154f, 154g, and 154h each of which has a first principal surface and a second principal surface on a side opposite to the first principal surface and is bent such that the first principal surface is on the inner side of the second principal surface. The second resin sheets 154a to 154h are collectively referred to as second resin sheets 154.

The second resin sheets 154 are provided between at least four corner portions CAa to CAd and a panel holder 30. The second resin sheets 154 and the second cushion members 152 are provided to surround the display region DA, and regions corresponding to four central portions SAa to SAd include a region where the second resin sheets 154 are not provided. In the region where the second resin sheets 154 are not provided, a lower surface Sl of the second cushion member 152 is adhered to the panel holder 30. The lower surface Sl of the second cushion member 152 may have adhesiveness.

Similarly to the liquid crystal display apparatus 100A, the liquid crystal display apparatus 100C can effectively suppress deterioration of display quality in a state where the display panel 10 is deformed.

In the liquid crystal display apparatus 100C, the first resin sheets 144 and the first cushion members 142 are provided to surround the display region DA, and thus it is possible to suppress infiltration of foreign substances and light leakage from between the front cover 20 and the display panel 10. Since the second resin sheets 154 and the second cushion members 152 are provided to surround the display region DA, it is possible to suppress infiltration of foreign substances and light leakage from between the display panel 10 and the panel holder 30.

Also in the present embodiment, the adhesive layers 64 and 66 can be omitted as in the second embodiment.

Figure 14:
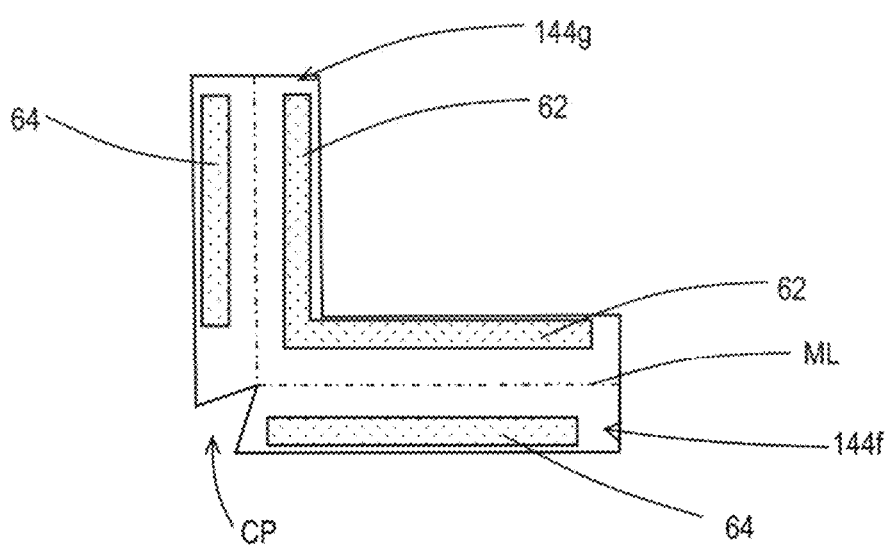
FIG. 14 is a schematic view illustrating a method of manufacturing the first buffer member 140.

For example, the first buffer member 140 can be manufactured by preparing eight resin sheets corresponding to the first resin sheets 144a to 144h. Alternatively, as described with reference to FIG. 14, the first resin sheets (for example, the first resin sheets 144g and 144f) adjacent to each other with the rectangular corners of the display panel 10 can also be manufactured from one resin sheet (manufactured as one body). As illustrated in FIG. 14, L-shaped resin sheets corresponding to the first resin sheets 144g and 144f are prepared. A cutout portion CP is formed in the L-shaped corner portion. The resin sheet is bent on an alternating dotted-dashed line ML so that the first principal surface is on the inner side of the second principal surface. At this time, the adhesive layers 62 and 64 (for example, double-sided tape) may be applied on the second principal surface (the principal surface on the outer side). In the drawings, a fold is indicated by the alternating dotted-dashed line ML for ease of understanding, but it is preferable that perforations or the like be not formed on the alternating dotted-dashed line ML. The first buffer member 140 is obtained in combination with the first cushion member 142.

The second buffer member 150 can also be manufactured in the same manner as the first buffer member 140.

In the illustrated example, each of the four central portions SAa, SAb, SAc, and SAd is provided with one first cushion member 42 and one second cushion member 52, but the embodiments of the present invention are not limited thereto. Each of the four central portions SAa, SAb, SAc, and SAd may be provided with a plurality of first cushion members 42 and/or a plurality of second cushion members 52.

The described embodiments can also be appropriately combined. For example, the first buffer member (or the second buffer member) in the first embodiment and the second buffer member (or the first buffer member) in the third embodiment may be combined.

The liquid crystal display apparatus according to the embodiment of the disclosure can effectively suppress deterioration of display quality in a state where the substrate of the display panel is deformed.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display apparatus comprising:
    a display panel having a display surface having a shape of a rectangle and a back surface on a side opposite to the display surface, and a display region including a central portion of the rectangle and a peripheral region surrounding the display region;
    a front cover provided on the display surface side of the display panel and covering the peripheral region of the display panel;
    a first buffer member provided between the display panel and the front cover;
    a panel holder provided on the back surface side of the peripheral region of the display panel; and
    a second buffer member provided between the display panel and the panel holder,
    wherein the peripheral region includes
        four corner portions each including a corresponding one of four corners of the rectangle, and
        four central portions which are each disposed between corresponding ones of the four corner portions and extend along four sides of the rectangle,
    at least one buffer member of the first buffer member and the second buffer member includes
        a plurality of cushion members which are formed of a resin and each of which is provided between one of the four central portions and the front cover or between one of the four central portions and the panel holder, and
        at least one resin sheet which has a one principal surface and an other principal surface on a side opposite to the one principal surface, is bent such that the one principal surface is on an inner side of the other principal surface, and is provided at least between the four corner portions and the front cover or at least between the four corner portions and the panel holder, and
    the at least one buffer member does not include a cushion member formed of a resin between the four corner portions and the front cover or between the four corner portions and the panel holder.

2. The liquid crystal display apparatus according to claim 1,
    wherein the first buffer member includes
        a plurality of first cushion members which are formed of a resin and each of which is provided between any one of the four central portions and the front cover, and
        at least one first resin sheet which has a first principal surface and a second principal surface on a side opposite to the first principal surface, is bent such that the first principal surface is on an inner side of the second principal surface, and is provided at least between the four corner portions and the front cover, and
    the first buffer member does not include a cushion member formed of a resin between the four corner portions and the front cover.

3. The liquid crystal display apparatus according to claim 2,
    wherein the at least one first resin sheet is also provided between each of the four central portions and the front cover, and the at least one first resin sheet is bent to accommodate the plurality of first cushion members therein.

4. The liquid crystal display apparatus according to claim 3,
    wherein each of the plurality of first cushion members includes an upper surface on the front cover side and a lower surface on the display panel side, and
    the upper surface of each of the plurality of first cushion members is adhered to the first principal surface of the at least one first resin sheet.

5. The liquid crystal display apparatus according to claim 2,
    wherein the four central portions include regions where the at least one first resin sheet is not provided between the four central portions and the front cover.

6. The liquid crystal display apparatus according to claim 5,
    wherein each of the plurality of first cushion members includes an upper surface on the front cover side and a lower surface on the display panel side, and
    the upper surface of each of the plurality of first cushion members is adhered to the front cover.

7. The liquid crystal display apparatus according to claim 2,
    wherein the second principal surface of the at least one first resin sheet and the front cover are adhered to each other through an adhesive layer.

8. The liquid crystal display apparatus according to claim 7,
    wherein the second principal surface of the at least one first resin sheet and the display panel are adhered to each other through an adhesive layer.

9. The liquid crystal display apparatus according to claim 7,
    wherein the second principal surface of the at least one first resin sheet and the display panel are in direct contact.

10. The liquid crystal display apparatus according to claim 2,
wherein the at least one first resin sheet and the plurality of first cushion members are black.

11. The liquid crystal display apparatus according to claim 1,
wherein the second buffer member includes
a plurality of second cushion members which are formed of a resin and each of which is provided between any one of the four central portions and the panel holder, and
at least one second resin sheet which has a third principal surface and a fourth principal surface on a side opposite to the third principal surface, is bent such that the third principal surface is on an inner side of the fourth principal surface, and is provided at least between the four corner portions and the panel holder, and
the second buffer member does not include a cushion member formed of a resin between the four corner portions and the panel holder.

12. The liquid crystal display apparatus according to claim 11,
wherein the at least one second resin sheet is also provided between each of the four central portions and the panel holder, and the at least one second resin sheet is bent to accommodate the plurality of second cushion members therein.

13. The liquid crystal display apparatus according to claim 12,
wherein each of the plurality of second cushion members has an upper surface on the display panel side and a lower surface on the panel holder side, and
the upper surface of each of the plurality of second cushion members is adhered to the third principal surface of the at least one second resin sheet.

14. The liquid crystal display apparatus according to claim 11,
wherein the four central portions include a region in which the at least one second resin sheet is not provided between the four central portions and the panel holder.

15. The liquid crystal display apparatus according to claim 14,
wherein each of the plurality of second cushion members has an upper surface on the display panel side and a lower surface on the panel holder side, and
the upper surface of each of the plurality of second cushion members is adhered to the display panel.

16. The liquid crystal display apparatus according to claim 11,
wherein the fourth principal surface of the at least one second resin sheet and the panel holder are adhered to each other through an adhesive layer.

17. The liquid crystal display apparatus according to claim 16,
wherein the fourth principal surface of the at least one second resin sheet and the display panel are adhered to each other through an adhesive layer.

18. The liquid crystal display apparatus according to claim 16,
wherein the fourth principal surface of the at least one second resin sheet and the display panel are in direct contact with each other.

19. The liquid crystal display apparatus according to claim 1,
wherein the first buffer member includes
a plurality of first cushion members which are formed of a resin and each of which is provided between any one of the four central portions and the front cover, and
at least one first resin sheet which has a first principal surface and a second principal surface on a side opposite to the first principal surface, is bent such that the first principal surface is on an inner side of the second principal surface, and is provided at least between the four corner portions and the front cover,
the first buffer member does not include a cushion member formed of a resin between the four corner portions and the front cover,
the second buffer member includes
a plurality of second cushion members which are formed of a resin and each of which is provided between any one of the four central portions and the panel holder, and
at least one second resin sheet which has a third principal surface and a fourth principal surface on a side opposite to the third principal surface, is bent such that the third principal surface is on an inner side of the fourth principal surface, and is provided at least between the four corner portions and the panel holder, and
the second buffer member does not include a cushion member formed of a resin between the four corner portions and the panel holder.

* * * * *